June 5, 1951 A. E. STOCKER 2,555,664
SERVO ELECTRIC BRAKE
Filed Dec. 19, 1945 2 Sheets-Sheet 1
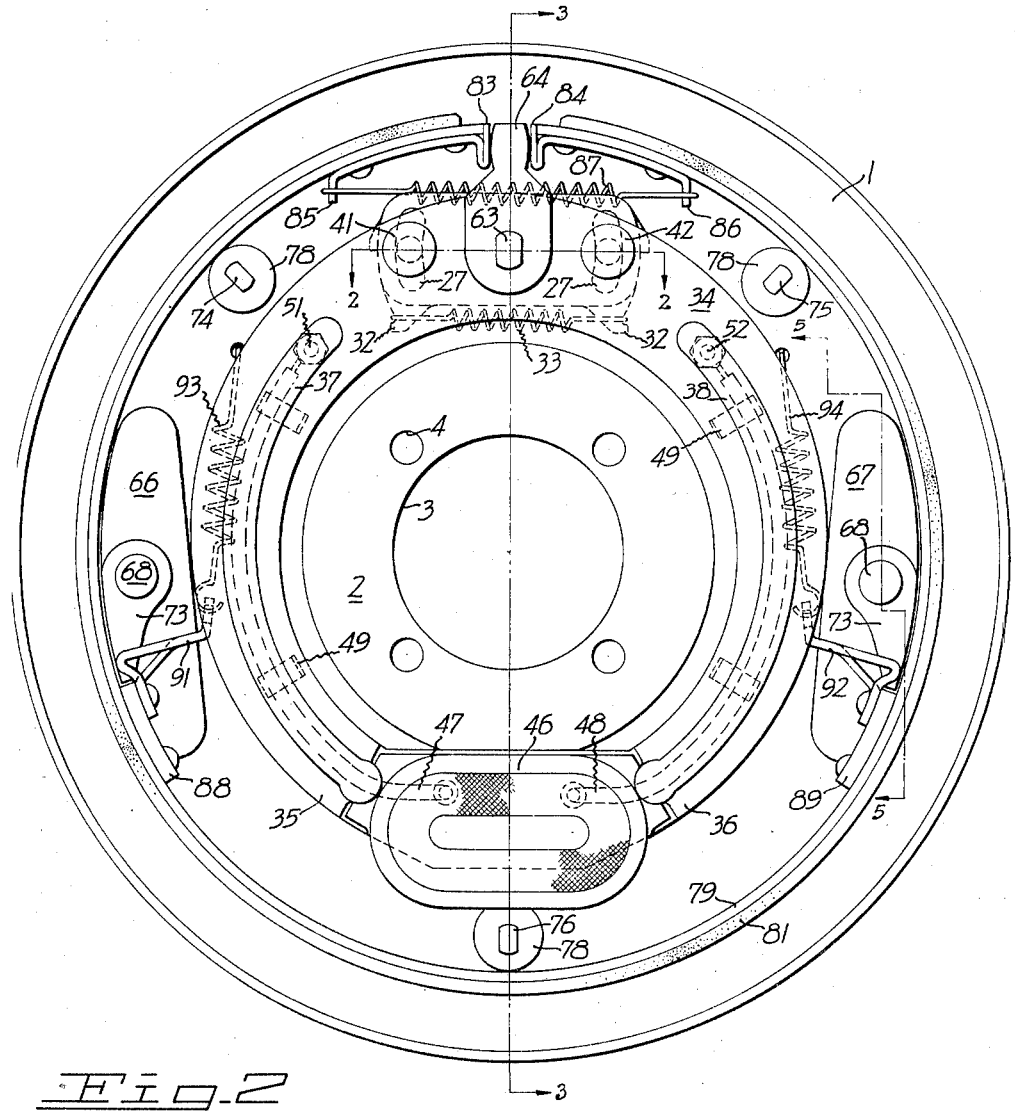
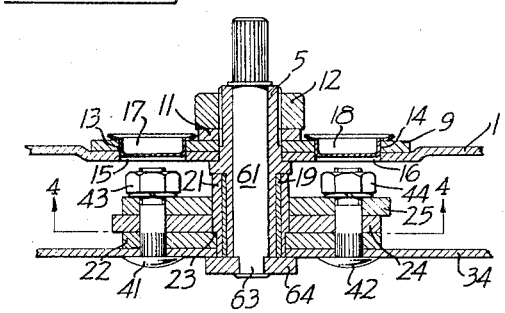
INVENTOR.
ALFRED E. STOCKER

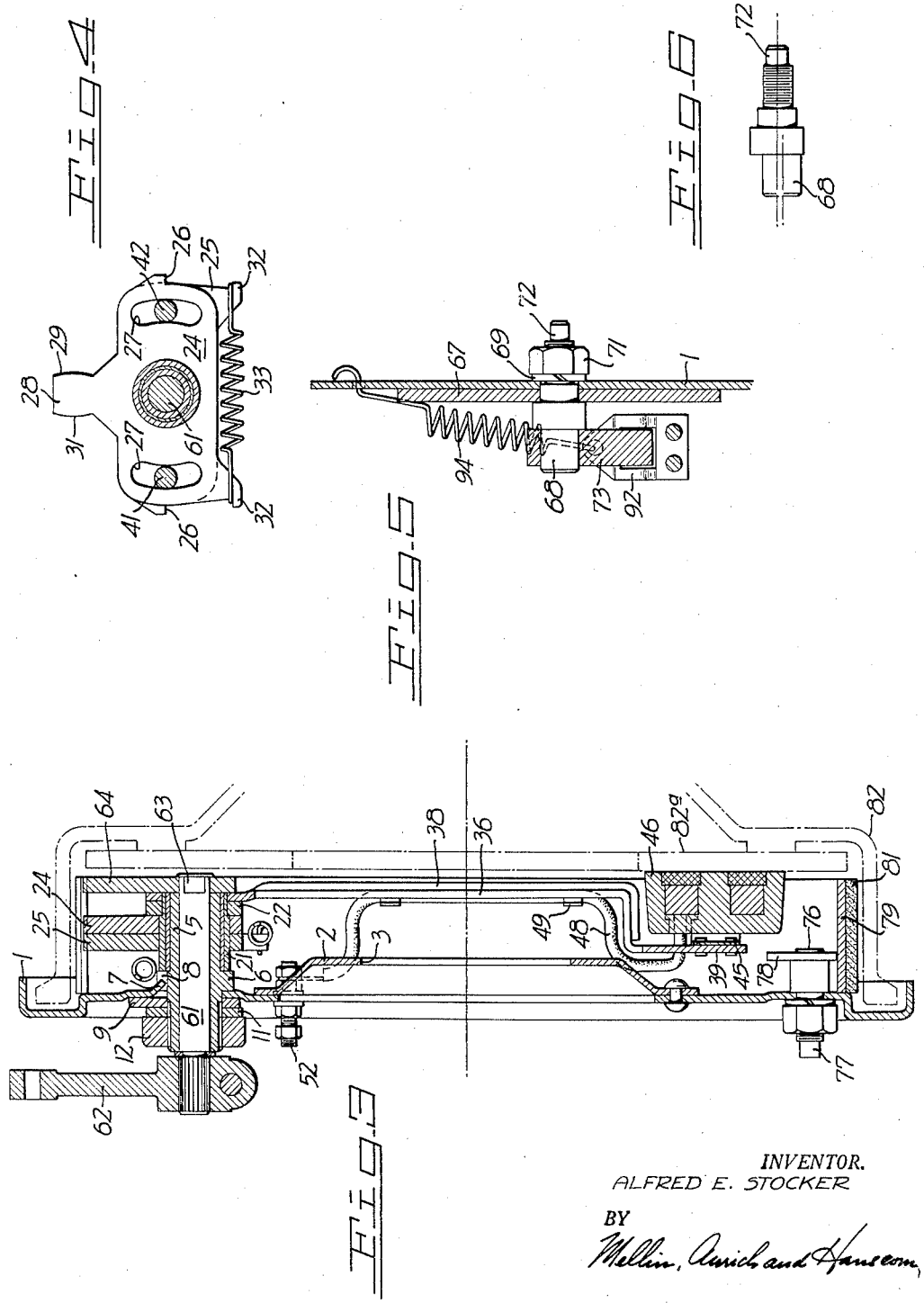

Patented June 5, 1951

2,555,664

UNITED STATES PATENT OFFICE 2,555,664

SERVO ELECTRIC BRAKE

Alfred E. Stocker, Mercer Island, Wash., assignor to Anchor Brake Corporation, Oakland, Calif., a corporation of California Application December 19, 1945, Serial No. 636,036

5 Claims. (Cl. 188—138)

This invention relates to a servo electric brake and has in general for its object the provision of a brake of this type, wherein only a portion of its continuous brake band is brought into play during a braking operation; wherein the brake band spreading mechanism can be readily adjusted to compensate for wear or for any other reason, and wherein most of its parts are interchangeable and can therefore be used for right or left-hand brakes.

The invention possesses other advantageous features, some of which with the foregoing will be set forth at length in the following description where those forms of the invention which have been selected for illustration in the drawings accompanying and forming a part of the present specification are outlined in full. In said drawings, two forms of the invention are shown, but it is to be understood that it is not limited to such forms, since the invention, as set forth in the claims, may be embodied in a plurality of forms.

Referring to the drawings:

Fig. 1 is a front elevation of a servo electric brake embodying the objects of my invention with its armature plate removed better to illustrate its construction.

Fig. 2 is a fragmentary horizontal section taken on the section line 2—2 of Fig. 1.

Fig. 3 is a vertical mid-section taken on the line 3—3 of Fig. 1.

Fig. 4 is a section taken on the line 4—4 of Fig. 2.

Fig. 5 is a vertical section taken on the offset section line 5—5 of Fig. 1.

Fig. 6 is a side elevation of one of the eccentric anchor pins used for anchoring the brake band intermediate its ends.

In general, the brake illustrated in these figures includes a back plate arranged for mounting on the axle housing of a vehicle and through which an axle of the vehicle passes. Journaled on the upper end of the back plate along the vertical diameter thereof is a fulcrum pin and journaled on this pin is a downwardly extending wish-bone. Mounted on the lower ends of the wish-bone for transverse sliding movement therein is an electromagnet arranged when energized to engage an armature disc fastened to the adjacent brake drum for rotation therewith. Expandably mounted on the back plate is a circular brake band, split at its upper diameter for the reception of an adjustable, two-part actuating lever formed as an upwardly extending and integral part of the wish-bone. Also journaled on the fulcrum pin is a shaft to which is fixed a brake band expanding cam arranged to be operative as a hand brake independently of the operation of the electromagnet. Fixed to the inside of the brake band on either side of its vertical diameter and at about 30° below its horizontal center line are a pair of stops each arranged to be engaged by a complementary and adjustable stop fixed to the back plate.

Normally the brake band is held in its inoperative and retracted position by a set of symmetrically arranged springs. However, when the electro-magnet is energized, it contacts the rotary armature ring and tends to follow it, thereby causing the actuating lever to swing to one side, which in turn expands the brake band. If the actuating lever swings to the right (clockwise as viewed in Fig. 1) the complementary stops on the left side of the brake engage each other, thereby limiting the area of contact between the band and the drum to 240°. If the actuating lever is swung to the left (counter-clockwise), the stops on the right side of the brake engage each other, again limiting the area of contact between the band and the drum to 240°.

To enable the brake to be used as an emergency or hand brake, a lever is keyed to the fulcrum pin and the free end of the lever is connected by a rod or cable to a conveniently located hand lever.

Referring now particularly to the drawings, the brake illustrated therein comprises an apertured back plate 1, stiffened by an inwardly dished stiffening member 2. The stiffening member 2 is provided with a central opening 3 for the reception of a wheel axle and with bolt holes 4 by means of which the back plate can be fastened to the stationary axle housing of a vehicle.

Mounted on the back plate 1, adjacent the upper end of its vertical diameter is a hollow cam shaft stud 5 provided intermediate its ends with a flange 6 in engagement with inner face of the back plate. Pressed inwardly from the back plate 1 is a finger 7, keyed in a slot 8 formed in the flange 6. Seated against the outer face of the back plate 1 over the protruding end of cam shaft stud 5 is a generally rectangular reinforcing plate 9. Threaded on the end of the stud 5 against a lock washer 11 is a nut 12. Formed in the reinforcing plate 9 on either side of the stud 5 are a pair of openings 13 and 14 in registration respectively with a pair of openings 15 and 16 provided in the back plate and which can be closed by a pair of caps 17 and 18 (see Fig. 2).

Journaled on the cam shaft sleeve 5 is a bearing bushing 19 and mounted on and having a press fit therewith is a cam shaft sleeve 21. Press-fitted on the sleeve 21 is a rectangular plate 22, the rear face of which seats on a shoulder 23 formed on the sleeve. Journaled on the sleeve 21 intermediate its ends are a pair of opposed but identical cam plates 24 and 25 (Fig. 4), each provided at one end with a shoulder 26 and each provided at both of its ends with opposed arcuate bolt slots 27. Extending upwardly from each of the cam plates 24 and 25 is a cam or lever 28 having symmetrical and opposed cam faces 29 and 31. Formed on the lower, outer corner of each of plates 24 and 25 is a lug 32, to which is secured a spring 33. Mounted on the end of the sleeve 21 is a yoke lever 34, including a pair of depending arms 35 and 36 symmetrically arranged with respect to the vertical diameter of the brake. Pressed outwardly from each of the arms 35 and 36 are reinforcing or stiffening ribs 37 and 38 and welded to and across the lower ends of these arms is a magnet holder 39. The two opposed cam plates 24 and 25, the rectangular plate 22 and the yoke lever 34 are bolted together as an integral structure for swinging movement about the cam shaft sleeve 5, by bolts 41 and 42 extending through the slots 27 of the cam plates 24 and 25, and through holes formed in the plate 22 and yoke lever 34. Access to the nuts 43 and 44 threaded to the inner ends of the bolts 41 and 42 can be had by removing the caps 17 and 18.

Secured to the exposed face of the magnet holder 39 is an anti-rattle spring 45 and slidably mounted in the holder 39 for transverse movement therein and with its rear face in contact with the spring 45 is an electro-magnet 46. Connected to the opposed ends of the magnet are electric leads 47 and 48 accommodated in the channels formed on the under side of the ribs 37 and 38, and held in place by clips 49. The upper ends of the leads 47 and 48 are anchored to insulated binding posts 51 and 52, which in turn communicate through suitable pigtails with a source of direct current.

Journaled in the cam shaft sleeve 5 is a shaft 61, having an outer knurled end for the reception of a hand brake lever 62 (Fig. 3). The opposite end of the shaft 61 terminates in a square end 63 for the reception of a hand brake cam 64, the cam 64 being fastened in place by staking.

Welded to the back plate are diametrically opposed but identical dog plates 66 and 67, and adjustably mounted in each of these plates is an eccentric brake band anchor pin 68 (see Fig. 7). The pins 68 are held in any adjusted position by a split washer 69 and a nut 71. Formed on the exposed end of each of the pins 68 is a wrench face 72 by which the pin can be turned (after its nut is loosened) so as to adjust its opposed eccentric end. Journaled on the eccentric end of the pins 68 is a dog 73, the position of which, in relation to the back plate 1, can, of course, be adjusted by means of the wrench face 72 as above explained.

Symmetrically mounted about the back plate 1, and adjustably secured thereto by split washers and nuts, are three brake band adjusting cam pins 74, 75 and 76, each terminating in a wrench face 77. Eccentrically secured to the inner end of each of the pins 74, 75 and 76 is a cam disc 78.

Circumscribing the dogs 73 and the three cam discs 78 is a brake band 79 provided on its exterior face with a brake lining 81, arranged to engage a brake drum 82 mounted on an adjacent wheel. As shown in Figs. 1 and 4, the two opposed ends of the brake band 79 terminate at points adjacent the brake cams 28 and 64 and are provided with opposed cam shoes 83 and 84 provided at their outer ends with perforated down-turned ears 85 and 86. Secured to and between the ears 85 and 86 is a coil spring 87 for holding the ends of the brake band in their inoperative position away from the brake drum.

Riveted to the brake band 79 below its horizontal center line are a pair of opposed stop members 88 and 89 arranged to engage one of the dogs 73 and provided with inwardly extending ears 91 and 92. Secured to and between the back plate 1 and the ears 91 and 92 are coil springs 93 and 94 serving to maintain the brake band equally spaced at all points from the brake drum when the brake band is in its inoperative position.

To adjust the brake above described, so that there will be proper and uniform clearance between the brake band and drum when the band is in its retracted position, the two pins 68 and the three pins 74, 75 and 76 are simply rotated (after their nuts have been loosened) so as to bring the outer face of the dogs 73 and the eccentric discs 78 into the desired engagement with the brake band. This having been done, the pins are fastened down. The same procedure can be followed when the brake lining wears, and it is desired to take up the resulting play.

In effect, the two levers 28 of the cam plates 25 and 24 constitute a single lever of adjustable width for by loosening the nuts 43 and 44, these plates will be urged to rotate in opposite directions by the spring 33, so as to increase the distance between the outer face of one cam and the outer face of the other cam until these opposed faces respectively engage the shoes 83 and 84. After the nuts 43 and 44 are tightened, the brake is ready for operation.

When the magnet 46 is energized, it will be attracted to the armature disc 82a mounted on the brake drum 82, and will tend to move with it. If as viewed in Fig. 1, the magnet 46 and the yoke 34 move in a clockwise direction, the cams 28 will force the right end of the brake band in a clockwise direction until the stop 88 engages the left dog 73. From this it will be seen that the brake band and the brake drum will come into frictional engagement over a total angle of about 240°. If the armature disc rotates in the opposite direction, so as to move the magnet 46 in a counter-clockwise direction, the cam 28 will force the left end of the brake band to move in a counter-clockwise direction until the stop 89 comes into engagement with the right-hand dog 73. Regardless then of whether the armature disc moves in a clockwise or counter-clockwise direction, the brake band will always engage the brake drum throughout an angle of 240°.

Another advantageous feature of the brake above described is that it can be used as a hand brake as well as a foot brake. This is for the reason that the cam 64 can be operated by the lever 62 independently of the action of the electro-magnet 46 in either direction to expand the brake drum in the same manner as above described.

Also it should be noted from the above description that since all of the elements of my brake are interchangeable, they can be used either for right-hand or left-hand brakes.

I claim:

1. A brake comprising: a rotary brake drum; a fixed back plate mounted adjacent said brake drum; a split brake band expandably mounted on said back plate within said brake drum; a brake band expanding lever pivoted to said back plate within said brake band and adjacent its ends; a pair of identical and symmetrical cams pivoted to said back plate coaxial with said lever with their outer ends extending between the ends of said brake band; means for locking said cams to said lever in any predetermined angular position with respect to each other; and means for actuating said lever.

2. A brake comprising: a rotary brake drum associated with a fixed back plate; a split brake band expandably mounted on said back plate; a brake band expanding lever pivoted on said back plate inwardly of the ends of said band; a pair of laterally adjustable cams mounted on said lever and extending between the ends of said band; stops mounted on said back plate and on said band for limiting the peripheral movement of said band; and means for actuating said lever.

3. A brake symmetrical about its vertical center line comprising: a rotary brake drum associated with a fixed back plate; a split brake band mounted on said back plate within said drum; a plurality of eccentric brake band positioning pins, symmetrically and adjustably mounted on said back plate within and immediately adjacent said brake band; a pair of stop members secured to the inner face of said brake band on either side of its vertical center line; a pair of peripherally and radially adjustable dogs symmetrically mounted on said back plate, respectively adjacent said stop members, one for limiting the peripheral movement of said band in one direction, and one for limiting said movement in the opposite direction; a lever pivoted intermediate its ends to said back plate with its outer end disposed between the ends of said brake band; and means for actuating said lever.

4. A servo electro magnetic brake comprising: a rotary brake drum; an armature disc fastened to said drum for rotation therewith; a fixed back plate mounted adjacent said brake drum; a split brake band expandably mounted on said back plate; stop means carried by said brake drum and said brake band intermediate the ends thereof, for limiting the peripheral movement of said band in either direction; a brake band expanding lever pivoted to said back plate within said drum and including a pair of cam members extending between the ends of said brake band and arranged for peripheral adjustment with respect to each other, so as to vary the over all distance between their opposed brake band engaging surfaces; an electro magnet mounted on the inner end of said lever; and means for energizing said magnet so as to draw it into surface engagement with said armature disc.

5. A brake suitable for use either as a left hand or as a right hand brake comprising: a rotary brake drum associated with a fixed back plate, said plate being symmetrical about its vertical center line; a split brake band expandably mounted on said back plate; a symmetrical brake band expanding lever pivoted on said back plate inwardly of the ends of said band; a pair of symmetrical laterally adjustable cams mounted on said lever and extending between the ends of said band; symmetrical stops symmetrically mounted on said back plate and on said brake band for limiting the peripheral movement of said band; and means for actuating said lever.

ALFRED E. STOCKER.

REFERENCES CITED

The following references are of record in the file of this patent:

UNITED STATES PATENTS

| Number | Name | Date |
|---|---|---|
| 1,443,775 | Weymouth | Jan. 30, 1923 |
| 2,024,847 | Chambers | Dec. 17, 1935 |
| 2,051,920 | Turgot | Aug. 25, 1936 |
| 2,074,725 | Goepric | Mar. 23, 1937 |